Patented Nov. 2, 1948

2,452,553

UNITED STATES PATENT OFFICE 2,452,553

FISHING BAIT

Osborn M. Curtis, Jr., and Theodore M. Prudden, Hingham, Mass., assignors to LobLure, Inc., Hingham, Mass., a corporation of Maine No Drawing. Application January 30, 1946, Serial No. 644,436

2 Claims. (Cl. 99—3)

Our present invention relates to the accurate control of the dissemination of a fishing bait in the fishing water, particularly a bait for lobsters.

Our bait consists of a luring essence combined with a suitable carrier. The essence may be a concentrate of the lobster attractive elements naturally present in dead fish or animal matter (or manufactured chemicals similar to such naturally occurring elements) and our carrier may be any vehicle which will enable the rate of dissemination of the luring essence into the fishing water to be accurately controlled and limited.

If the bait we use is manufactured, it will differ in several important respects from natural bait, such as fish heads and scraps of fish carcasses. Among such differences are the following: One requirement of the usual fishing bait is that it shall dispense its luring essence as soon as it is placed in the fishing water, for fishermen cannot delay their fishing while the bait disseminates. A lobster bait, on the other hand, should not immediately dispense itself in the fishing water, for lobster pots are usually left down for at least twenty-four hours and the bait should continue to disseminate its lobster attractive essence during all of that period and especially during the night when the lobsters are most active; yet pots are usually baited and replaced during the morning or early afternoon. Actually a lobster bait should be very slow to give up its lobster attractive essence, and preferably should not begin to do so until several hours at least after the pot has been dropped to the sea bottom and darkness has fallen.

Another desired requirement of a lobster bait is that it should be protected during the plunge to the bottom of the ocean when a freshly baited lobster pot is thrown overboard. This plunge scours the bait almost as though a fire hose were played on it, and hence the bait should be protected against this drastic washing away effect which removes much of the attractive elements of the bait.

Accordingly, we have provided in our present invention for accurately controlling and limiting the rate of dissemination of the lobster attractive essence into the fishing water. This may be done in any of several ways, depending upon whether the bait is in fluid, paste, or solid form, and depending upon the type of container used.

If the bait is in fluid form, we may place the same in a container having a wick which when immersed in the fishing water causes a continuous and controlled dissemination of the luring essence in the water. Or we may place it within a container having a carefully controlled outlet orifice through which the fluid gradually escapes.

If the bait is in solid or paste form, we may wrap it in a paper container which will itself become dissolved by the action of the fishing water after immersion therein for a predetermined length of time. Or such paper container may have a glued seam, which will be dissolved by the fishing water after immersion therein for a predetermined length of time. Or such bait could be placed in a bait box having vanes which open after immersion in the fishing water for a predetermined length of time to permit the sea water to wash over the bait and thus cause its controlled dissemination. Or the specific gravity of the bait, whether in fluid, paste or solid form, may be regulated by heavily salting it so that it is heavier than sea water and hence will escape slowly at a predetermined rate from the container. The reverse of this would be through capillarity using a fluid bait of less specific gravity than sea water which would climb up a wick at a controlled rate and expend itself. Still another expedient is to combine the bait with chemicals which will react with the sea water and gradually produce a controlled dissemination of the essence. Or cakes of the bait may be dipped in a water-soluble covering, such as a boiled-down sugar solution, which will solidify and provide a water-soluble protective cover for the bait.

Another way to dispense this bait might be to impregnate a sponge-like material, such as sawdust, with the luring essence and then compact this sponge-like mass. The action of the sea water would expand the sawdust and break up the solidity of the mass to release the luring essence.

In the case of a solid bait our preferred way, however, is to combine our essence into a dissolving base or binder, similar to soap, which will slowly dissolve in the fishing water and release the essence. Our use of a dissolving binder is important in obtaining a regulated rate of dissemination of the fish attractive essence, and is new in the art. This results in a bait of relatively small bulk and high concentration of the luring essence in which the rate of release can be controlled within very close limits.

Because each small compact unit of our concentrated bait is much more expensive per bulk than fish carcasses or similar natural bait and the release of even a small part of our concentrated bait essence is as effective as that of a much larger bulk of natural bait, the accurate control of its dispersion in the fishing water is very important.

Although soap is a preferable dissolvable base material or binder, other gradually dissolving substances may be employed. The use of such materials is especially desirable in a manufactured bait where the more volatile chemicals which might constitute the essence are apt to dissipate their effectiveness too rapidly unless combined in the soap or like base material.

Having thus described our invention, what we claim as new and desire to secure by Letters Patent is:

1. A fishing bait for controlled dissemination in fishing water, comprising a luring essence, a liquid carrier, and a container having a restricted outlet opening for accurately controlling the dissemination of the essence when the bait is immersed in the fishing water.

2. The bait of claim 1 in which the luring essence is derived from matter of the class consisting of ground fish and animal matter.

OSBORN M. CURTIS, Jr.
THEODORE M. PRUDDEN.

REFERENCES CITED

The following references are of record in the file of this patent:

UNITED STATES PATENTS

| Number | Name | Date |
| --- | --- | --- |
| 871,486 | Debroisse | Nov. 19, 1907 |
| 973,549 | O'Bryant | Oct. 25, 1910 |
| 1,185,894 | Evans | June 6, 1916 |
| 1,366,509 | Thiessen | Jan. 25, 1921 |
| 1,703,324 | Sellen | Feb. 26, 1929 |
| 1,795,238 | Spence | Mar. 3, 1931 |